UNITED STATES PATENT OFFICE.

JOHN MURPHY, OF COLUMBUS, OHIO.

HYDRAULIC CEMENT.

SPECIFICATION forming part of Letters Patent No. 300,790, dated June 24, 1884.

Application filed April 2, 1884. (Specimens.)

*To all whom it may concern:*

Be it known that I, JOHN MURPHY, of Columbus, in the county of Franklin and State of Ohio, have invented certain new and useful Improvements in Hydraulic Cements; and I do hereby declare the following to be a full, clear, and exact description of the invention, such as will enable others skilled in the art to which it pertains to make and use it.

My invention relates to an improvement in hydraulic cement; and it consists in a composition of fibrolite, margarite, iron slag, shell-marl, or limestone and clay, as will be more fully described hereinafter.

The object of my invention is to produce a cement which has greater tenacity and which is more durable than the ordinary hydraulic cement now in use.

In making my cement I take of fibrolite, ten parts; margarite, ten parts; iron slag, thirty parts; shell-marl, forty parts; and clay, ten parts. These ingredients should be ground and mixed in a pug-mill, so as to make it all into a plastic mass, having sufficient adhesiveness to enable it to be molded into small bricks or blocks not more than two inches thick. These blocks are made this small so that they will dry quickly, and after having been dried are put in kilns and burned to a point of vitrification, the fuel used being coke or anthracite. The blocks are then taken and ground to a powder.

I am aware that limestone, clay, and slag have been used as elements in making cement, and these elements I disclaim as being wholly new.

Having thus described my invention, I claim—

A hydraulic cement composed of fibrolite, margarite, iron slag, shell-marl, and clay, which are mixed, burned, and then reduced to powder, as described.

In testimony whereof I affix my signature in presence of two witnesses.

JOHN MURPHY.

Witnesses:
    E. L. DEWITT,
    J. S. GOLD.